US006976552B1

(12) United States Patent
Kicker

(10) Patent No.: US 6,976,552 B1
(45) Date of Patent: Dec. 20, 2005

(54) REMOVABLE MOTORCYCLE ARMREST ASSEMBLY

(76) Inventor: David M. Kicker, Rte. 1, Box 126-B, Repton, AL (US) 36475

(*) Notice: Subject to any disclaimer, the term of this patent is extended or adjusted under 35 U.S.C. 154(b) by 0 days.

(21) Appl. No.: 11/002,042

(22) Filed: Dec. 3, 2004

(51) Int. Cl.⁷ .............................................. B62D 61/02
(52) U.S. Cl. .............. 180/219; 280/288.4; 297/411.29; 297/411.25
(58) Field of Search ............... 297/411.29, 411.26, 297/411.25, 411.23, 411.4, 411.41, 411.45; 280/288.4, 304.4, 727; 180/219

(56) References Cited

U.S. PATENT DOCUMENTS

| 1,378,704 | A | | 5/1921 | McPartland |
| 2,650,650 | A | * | 9/1953 | Brown .................. 297/411.25 |
| 2,725,928 | A | * | 12/1955 | Branick ................. 297/411.25 |
| 3,425,745 | A | | 2/1969 | Michels |
| 3,807,799 | A | | 4/1974 | Freedman |
| 4,111,448 | A | * | 9/1978 | Sklodowsky ............. 280/304.4 |
| 4,225,183 | A | | 9/1980 | Hanagan et al. |
| 4,695,096 | A | | 9/1987 | Kincaid |
| D412,867 | S | | 8/1999 | White |
| 6,164,725 | A | * | 12/2000 | Santa Cruz et al. .... 297/411.29 |

* cited by examiner

Primary Examiner—Milton Nelson, Jr.

(57) ABSTRACT

A removable motorcycle armrest assembly includes a motorcycle having a backrest support. Each of a pair of posts is provided and each includes a front side and a back side. A brace plate is attached to and extends between each of the back sides of the posts. Each of a pair of panels is attached to one of the front sides of the posts and extends toward each other. A biasing member biases the top ends of the posts toward each other. Each rod of a pair of elongated rods has a first portion and a second portion attached together at an angle. A free end of each of the first portions is removably extendable into wells in top ends of the posts. The support may be removably extended between the base plate and one of the panels so that the biasing member biases the posts against the support.

14 Claims, 4 Drawing Sheets

US 6,976,552 B1

REMOVABLE MOTORCYCLE ARMREST ASSEMBLY

BACKGROUND OF THE INVENTION

1. Field of the Invention

The present invention relates to motorcycle armrest devices and more particularly pertains to a new motorcycle armrest device for providing armrests that are easily attachable and detachable from a motorcycle rear seat support.

2. Description of the Prior Art

The use of motorcycle armrest devices is known in the prior art. U.S. Pat. No. 4,225,183 describes a motorcycle seat that includes a rear seat having armrest pivotally coupled thereto. Another type of motorcycle armrest device is U.S. Pat. No. 4,695,096 which is attached to a motorcycle seat and includes a pivoting mechanism so that it can be moved from an in-use to a stored position. Yet another such device is found in U.S. Pat. No. 6,614,725 which includes a bracket having a pair of armrests attached thereto which is coupled to a motorcycle seat so that the armrests extend forward from the bracket.

While these devices fulfill their respective, particular objectives and requirements, the need remains for an armrest device that is retrofittable to a motorcycle rear seat back support in such a manner that the device can be easily removed and attached to the support as needed. This should be accomplished without the need of permanently securing the device to the support. Such a device can be readily used for armrest for a child or for holding items, such as groceries, on the motorcycle seat.

SUMMARY OF THE INVENTION

The present invention meets the needs presented above by generally comprising a motorcycle that has a backrest support that includes a pair of vertical bars attached to and extending upwardly from the motorcycle. Each of a pair of posts has a bottom end and a top end and the top ends each has a well extending therein. The posts have a front side and a back side. A brace plate is attached to and extends between each of the back sides of the posts. Each of a pair of panels is attached to one of the posts. The panels are positioned on a respective one of the front sides of the posts. The panels extend toward each other. A biasing member selectively biases the top ends of the posts toward each other. A pair of elongate rods is provided. Each of the rods defines an armrest. The rods each have a first portion and a second portion attached together at an angle. A free end of each of the first portions is removably extendable into one of the wells. Each of the vertical bars may be removably extended between the base plate and one of the panels so that the biasing member biases each of the posts against one of the vertical bars.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
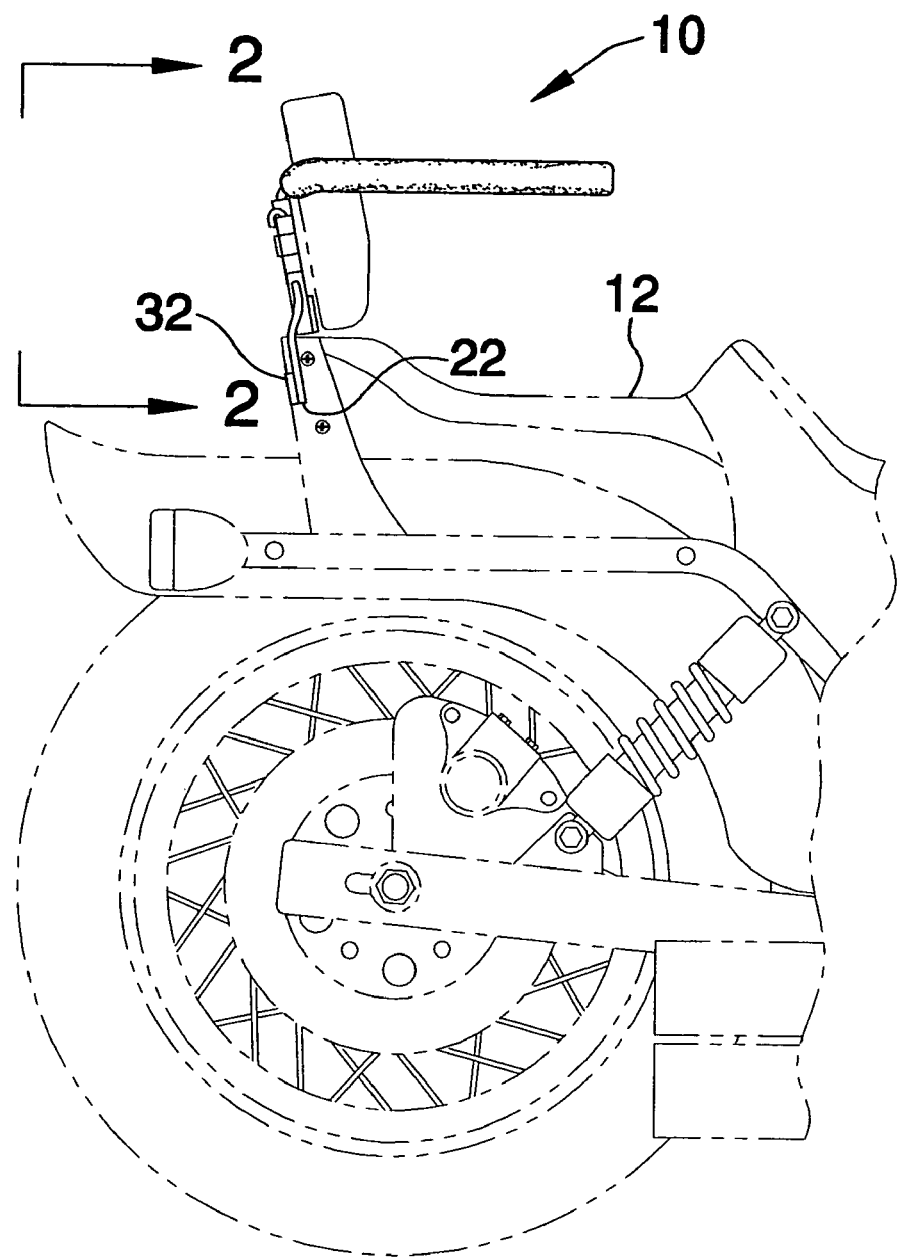
FIG. 1 is a side view of a removable motorcycle armrest assembly according to the present invention.
Figure 2:
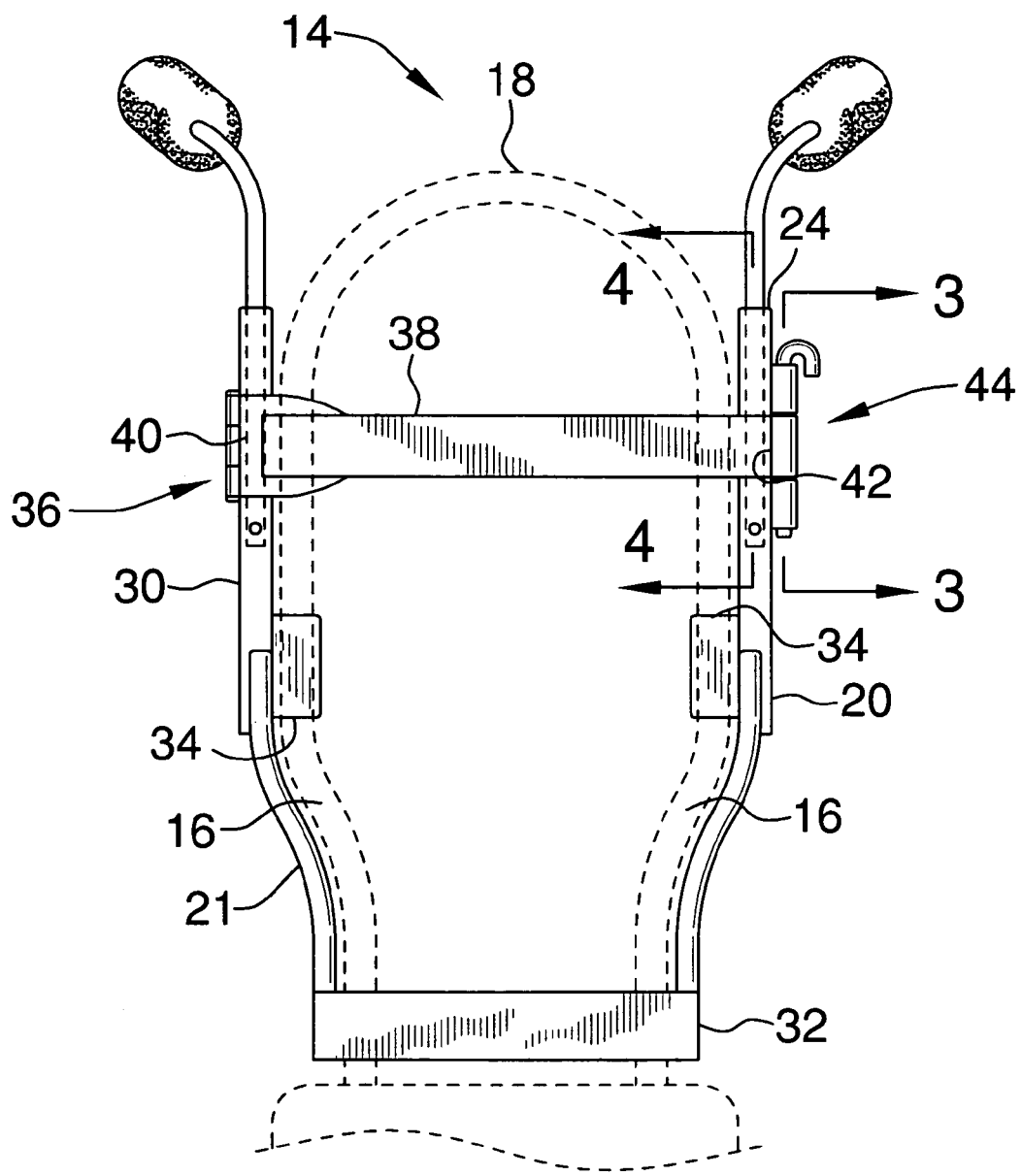
FIG. 2 is a back view of the present invention.
Figure 3:
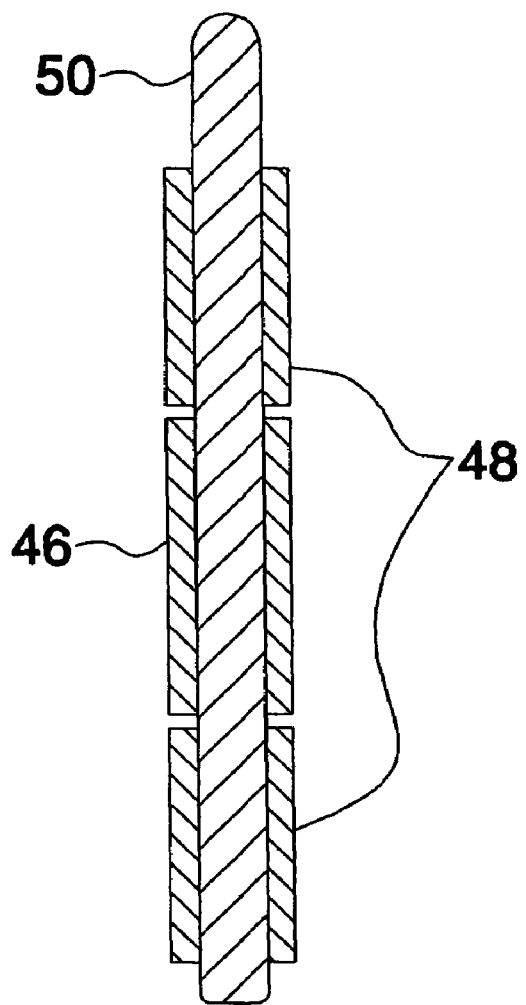
FIG. 3 is a cross-sectional view taken along line 3—3 of FIG. 2 of the present invention.
Figure 4:
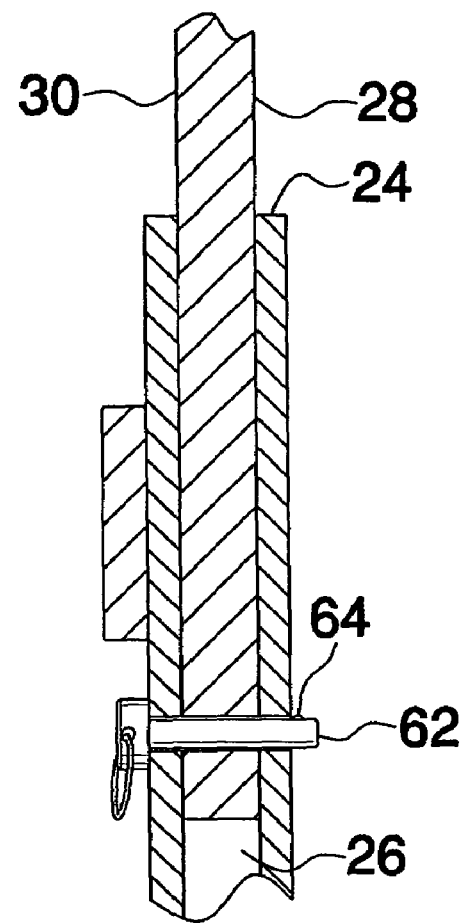
FIG. 4 is a cross-sectional view taken along line 4—4 of FIG. 2 of the present invention.
Figure 5:
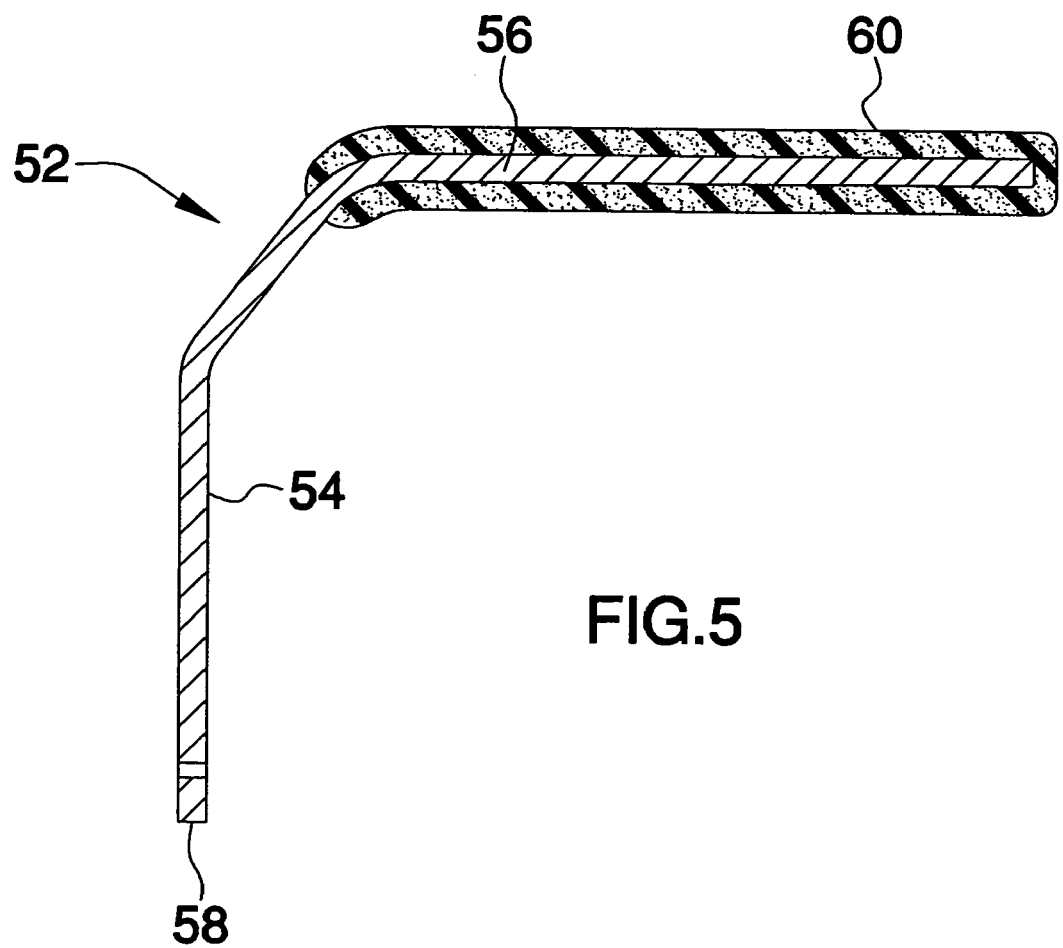
FIG. 5 is a cross-sectional view of an armrest of the present invention.

With reference now to the drawings, and in particular to FIGS. 1 through 5 thereof, a new motorcycle armrest device embodying the principles and concepts of the present invention and generally designated by the reference numeral 10 will be described.

As best illustrated in FIGS. 1 through 5, the removable motorcycle armrest assembly 10 generally comprises a motorcycle 12 that has a backrest support 14 that includes a pair of vertical bars 16 which are attached to and extend upwardly from the motorcycle 12. Typically, an arcuate member 18 will be attached to and extended between the upper ends of the bars 16. Such supports 14 are typically called sissy bars.

Each of a pair of posts 20, 21 has a bottom end 22 and a top end 24. The top ends 24 each have a well 26 extending therein. The posts 20, 21 have a front side 28 and a back side 30. A brace plate 32 is attached to and extends between each of the back sides 30 of the posts 20, 21. The brace plate 32 is positioned adjacent to the bottom ends 22 of the posts 20, 21 so that the posts 20 extend upwardly from the brace plate 32. The posts 20, 21 are spaced from each other a distance equal to between 8 inches and 14 inches and each of the posts 20 has a height generally between 6 inches and 12 inches.

Each of a pair of panels 34 is attached to one of the posts 30. Each of the panels 34 is positioned on a respective one of the front sides 28 of the posts 30. The panels 34 extend toward each other and are positioned generally between the top 24 and bottom 22 ends of the posts 20, 21.

A biasing member 36 is adapted for selectively biasing the top ends 24 of the posts 20, 21 toward each other. The biasing member 36 includes an elongated strap 38 that has a first end 40 and a second end 42. The first end 40 of the strap 38 is hingedly coupled to a first post 20 of the pair of posts. The strap 38 comprises a substantially rigid material which is preferably a metallic material. A coupler 44 is adapted for removably coupling the second end 42 of the strap 38 to a second post 21 of the pair of posts. The coupler 44 includes a first mating section 46 attached to the second end 42 of the strap 38 and a second mating section 48 attached to the second post 21. When aligned, the first 46 and second 48 mating sections provide a cylinder through which a pin 50 may be extended. The strap 38 extends across the back sides 30 of the posts 20, 21 when the strap 38 is coupled to the second post 21.

A pair of elongated rods 52 is provided and each defines an armrest. Each of the armrests is engaged with one of the top ends 24 of the posts 20, 21 so that the armrests extend forward of the vertical bars 16. Each of the rods 52 has a first portion 54 and a second portion 56 attached together at an angle. The angle is generally between 75 degrees and 120 degrees. The first portions 54 are engaged to the posts 20, 21 by removably extending a free end 58 of each of the first portions 54 into one of the wells 26. The second portions 56 each have a length generally between 9 inches and 16 inches. A cushioning material 60 is attached to and substantially covers each of the second portions 56 of the rods 52. The cushioning material 60 may comprise any conventional resiliently compressible material such as an elastomer. Each of a pair of fasteners 62 is adapted for selectively securing each of the rods 52 in a respective one of the wells 26 so that the second portions 56 generally extend away from the front sides 28 of the posts 20, 21. The fasteners 62 preferably have depressible ball bearings 64 therein. The fasteners 62 are extendable through the posts 20, 21 and through the first portions 54 positioned therein. The fasteners 62 prevent rotation of the rods 52.

In use, each of the vertical bars 16 may be removably extended between the base plate 32 and one of the panels 34. The biasing member 36 is then engaged so that each of the posts 20, 21 is biased against one of the vertical bars 16. This, in effect, clamps the posts 20, 21 to the support 14 without using permanent hardware or drilling into the support 14. The removable nature of the bars 52 allows for easy storage of the assembly 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A removable motorcycle armrest system, comprising:
    a motorcycle having a backrest support including a pair of vertical bars being attached to and extending upwardly from the motorcycle;
    a pair of posts each having a bottom end and a top end, each of said top ends having a well extending therein, each of said posts having a front side and a back side, a brace plate being attached to and extending between each of said back sides of said posts;
    a pair of panels, each of said panels being attached to one of said posts, each of said panels being positioned on a respective one of said front sides of said posts, said panels extending toward each other;
    a biasing member being adapted for selectively biasing said top ends of said posts toward each other;
    a pair of elongated rods each defining an armrest, each of said rods having a first portion and a second portion attached together at an angle, a free end of each of said first portions being removably extendable into one of said wells; and
    wherein each of said vertical bars may be removably extended between said brace plate and one of said panels such that said biasing member biases each of said posts against one of said vertical bars.

2. The system according to claim 1, wherein said brace plate is positioned adjacent to said bottom ends of said posts such that said posts extend upwardly from said brace plate.

3. The system according to claim 2, wherein said posts are spaced from each other a distance equal to between 8 inches and 14 inches, each of said posts having a height generally between 6 inches and 12 inches.

4. A system according to claim 2, wherein said panels are positioned generally between said top and bottom ends of said posts.

5. A system according to claim 1, wherein said biasing member includes:
    an elongated strap having a first end and a second end, said first end of said strap being hingedly coupled to a first post of said pair of posts, said strap comprising a substantially rigid material;
    a coupler adapted for removably coupling said second end of said strap to a second post of said pair of posts, said strap extending across said back sides of said posts when said strap is coupled to said second post.

6. A system according to claim 1, wherein said angel is generally between 75 degrees and 120 degrees.

7. A system according to claim 6, further including a cushioning material being attached to and substantially covering each of said second portions of said rods.

8. A system according to claim 6, further including a pair of fasteners, each of said fasteners being adapted for selectively securing each of said rods in a respective one of said wells such that said second portions generally extend away from said front sides of said posts.

9. A system according to claim 1, further including a pair of fasteners, each of said fasteners being adapted for selectively securing each of said rods in a respective one of said wells such that said second portions generally extend away from said front sides of said posts.

10. A system according to claim 1, further including a cushioning material being attached to and substantially covering each of said second portions of said rods.

11. A removable motorcycle armrest device for positioning on a pair of vertical bars of a motorcycle backrest support, said device comprising:
    a pair of posts each having a bottom end and a top end, each of said posts having a front side and a back side, a brace plate being attached to and extending between each of said back sides of said posts;
    a pair of panels, each of said panels being attached to one of said posts, each of said panels being positioned on a respective one of said front sides of said posts, said panels extending toward each other;
    a biasing member being adapted for selectively biasing said top ends of said posts toward each other;
    a pair of elongated rods each defining an armrest, each of said rods having a first portion and a second portion attached together at an angle, a free end of each of said first portions being coupled to one of said top ends of said posts; and
    wherein each of the vertical bars may be removably extended between said brace plate and one of said panels such that said biasing member biases each of said posts against one of the vertical bars.

12. A device according to claim 11, wherein said biasing member includes:
    an elongated strap having a first end and a second end, said first end of said strap being hingedly coupled to a first post of said pair of posts, said strap comprising a substantially rigid material;
    a coupler adapted for removably coupling said second end of said strap to a second post of said pair of posts, said strap extending across said back sides of said posts when said strap is coupled to said second post.

13. A device according to claim 11, further including a cushioning material being attached to and substantially covering each of said second portions of said rods.

14. A removable motorcycle armrest system, comprising:
- a motorcycle having a backrest support including a pair of vertical bars being attached to and extending upwardly from the motorcycle;
- a pair of posts each having a bottom end and a top end, each of said top ends having a well extending therein, each of said posts having a front side and a back side, a brace plate being attached to and extending between each of said back sides of said posts, said brace plate being positioned adjacent to said bottom ends of said posts such that said posts extend upwardly from said brace plate, said posts being spaced from each other a distance equal to between 8 inches and 14 inches, each of said posts having a height generally between 6 inches and 12 inches;
- a pair of panels, each of said panels being attached to one of said posts, each of said panels being positioned on a respective one of said front sides of said posts, said panels extending toward each other, said panels being positioned generally between said top and bottom ends of said posts;
- a biasing member being adapted for selectively biasing said top ends of said posts toward each other, said biasing member including:
  - an elongated strap having a first end and a second end, said first end of said strap being hingedly coupled to a first post of said pair of posts, said strap comprising a substantially rigid material:
  - a coupler adapted for removably coupling said second end of said strap to a second post of said pair of posts, said strap extending across said back sides of said posts when said strap is coupled to said second post;
- a pair of elongated rods each defining an armrest, each of said rods having a first portion and a second portion attached together at an angle, said angle being generally between 75 degrees and 120 degrees, a free end of each of said first portions being removably extendable into one of said wells;
- a cushioning material being attached to and substantially covering each of said second portions of said rods;
- a pair of fasteners, each of said fasteners being adapted for selectively securing each of said rods in a respective one of said wells such that said second portions generally extend away from said front sides of said posts; and wherein each of said vertical bars may be removably extended between said brace plate and one of said panels such that said biasing member biases each of said posts against one of said vertical bars.

* * * * *